United States Patent [19]
Otsuka

[11] Patent Number: 4,490,818
[45] Date of Patent: Dec. 25, 1984

[54] REPEATER STATION FOR USE IN A RADIO RELAY SYSTEM TO PROTECT TIME DEVIATIONS OF TIME SLOTS

[75] Inventor: Shigeru Otsuka, Tokyo, Japan

[73] Assignee: NEC Corporation, Tokyo, Japan

[21] Appl. No.: 486,384

[22] Filed: Apr. 19, 1983

[30] Foreign Application Priority Data

Apr. 20, 1982 [JP] Japan .................. 57-66934

[51] Int. Cl.³ .................. H04L 5/14; H04B 3/36
[52] U.S. Cl. .................. 370/26; 375/4; 455/16; 455/18
[58] Field of Search .......... 375/3, 4; 370/26, 29, 370/32, 24, 97, 108; 455/15, 16, 17, 18, 601

[56] References Cited
U.S. PATENT DOCUMENTS
4,387,466 6/1983 Sire .......................... 375/4

Primary Examiner—Joseph A. Orsino, Jr.
Attorney, Agent, or Firm—Laff, Whitesel, Conte & Saret

[57] ABSTRACT

In a repeater station for use in a repeater station to repeat a sequence of downward time slots and a succession of upward time slots, a detector (40) detects a synchronizing signal included in a particular one of the downward time slots. A timing circuit (41) produces a first timing signal when a first predetermined duration lapses after detection of the synchronizing signal. The first predetermined duration is preferably predictively determined in consideration of a reception time instant of a particular one of the upward time slots that corresponds to the particular downward time slot. Signals included in each upward time slot are memorized in a memory section (60) with reference to the first timing signal. The timing circuit further produces a second timing signal after the first timing signal to transmit the memorized signals to an upward station. The second timing signal is produced in consideration of a deviation with which the upward time slots reach the upward station.

2 Claims, 8 Drawing Figures

REPEATER STATION FOR USE IN A RADIO RELAY SYSTEM TO PROTECT TIME DEVIATIONS OF TIME SLOTS

BACKGROUND OF THE INVENTION

This invention relates to a repeater station for use in a time division multiple network operable as a radio relay system.

Such a time division multiple network comprises a central station and a plurality of substations remote from the central station. A radio relay system serves to carry out communication between the central station and the substations even when the substations are far from a coverage of the central station. For this purpose, at least one repeater station is placed between the central station and the substations in the radio relay system.

Each of conventional repeater stations is operable in response to a time division multiple signal which is arranged in a succession of time slots assigned to the substations carrying out communication. Such a time division multiple signal is supplied to each repeater station from an upper station and from a lower station situated upstream and downstream relative to each repeater station through various repeated paths, respectively. The upper station may be either the central station or another repeater station while the lower station, either a further repeater station or one of the substations.

As will later be described with reference to four figures of the accompanying drawing, a transmission time of the time division multiple signal is individually and irregularly variable in each of the repeated paths. This results in individual variations or time deviations of the time slots received at each repeater station. In addition, such a variation of the transmission time is increased when a plurality of the repeater stations are included in the repeated paths.

SUMMARY OF THE INVENTION

It is an object of this invention to provide a repeater station which can protect each time slot from being individually varied from one another.

It is another object of this invention to provide a repeater station of the type described which can avoid an increase of a variation of a transmission time.

It is a further object of this invention to provide a repeater station of the type described, wherein an upper station is not subjected to a harmful influence even when each time slot received at the repeater station is individually varied from one another.

A repeater station to which this invention is applicable is for repeating a first sequence of downward time slots from a first station to a second station as a second sequence of downward time slots and for transmitting a first succession of upward time slots to the first station in response to a second succession of upward time slots received from the second station. A particular downward time slot in each of the first and the second sequences comprises a synchronizing signal. A particular upward time slot in each of the first and the second successions corresponds to the particular downward time slot. Each of the downward and the upward time slots has a predetermined length except for the particular downward and upward time slots. The repeater station includes detecting means for detecting the synchronizing signal included in the first sequence to produce a detection signal. According to this invention, the repeater station comprises timing signal producing means responsive to the detection signal for producing a first and a second timing signal when a first predetermined duration lapses after detection of the synchronizing signal included in the first sequence and when a second predetermined duration lapses after production of the first timing signal, respectively, memory means coupled to the timing signal producing means for memorizing information carried in the upward time slots of the second succession, and reading means responsive to the second timing signal for reading the upward time slot information memorized in the memory means to produce the upward time slots of the first succession.

DESCRIPTION OF THE PREFERRED EMBODIMENTS

Figure 1:
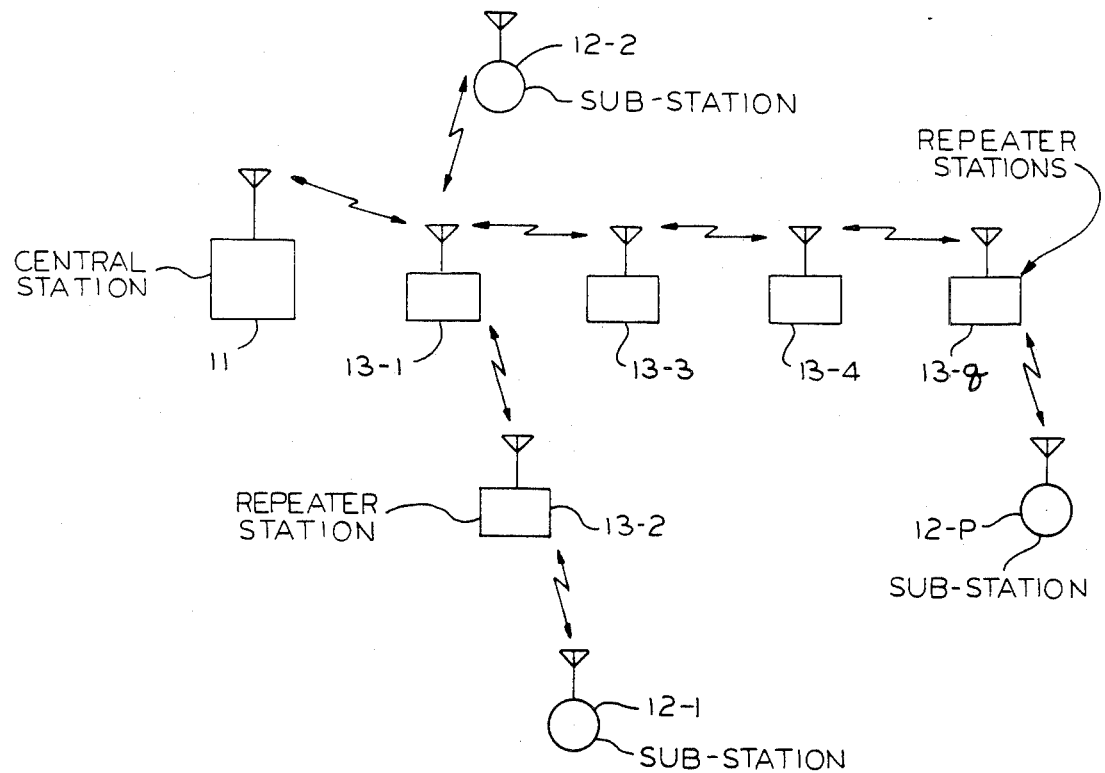
FIG. 1 shows, in block, a radio relay system comprising a plurality of repeater stations to each of which this invention is applicable.

Referring to FIG. 1, a radio relay system to which this invention is applicable is formed by a time division multiple network for carrying out communication by the use of time division multiple signals. Such time division multiple signals will be simply called signals hereinafter. The radio relay system comprises a central station 11 and a plurality of substations 12-1, 12-2, ..., 12-p remote from the central station 11. A plurality of repeater stations 13-1, 13-2, ..., 13-q are placed between the central station 11 and the substations 12-1–12-p. The number of the substations 12 (suffixes omitted) may be different from that of the repeater stations 13 (suffixes omitted also). The signals are repeated in each of the repeater stations 13 to be transmitted from each of the repeater stations 13 in a direction towards the central station 11 or towards the substations 12. The direction towards the central station 11 will be referred to as "upward" while the direction towards the substations 12, as "downward".

Figure 2:
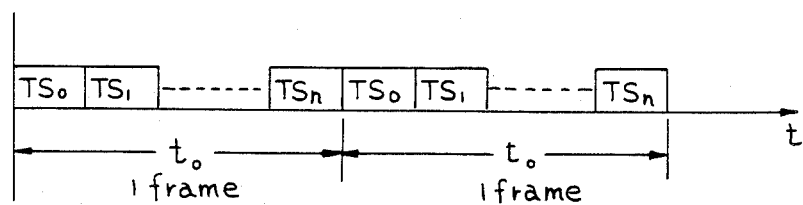
FIG. 2 exemplifies an arrangement of time slots sent downwardly from a central station illustrated in FIG. 1.

Temporarily referring to FIG. 2, a sequence of time slots $TS_0, TS_1, \ldots, TS_n$ is repeated at every frame to carry the signals. The frame lasts a duration $t_0$ of 4 milliseconds to put a predetermined number of bits therein. The predetermined number is equal to 2816 by way of example. The illustrated time slot sequence is for transferring the signals from the central station 11 downwards. The leading one of the time slots in each frame has a bit length of 304 bits and includes a frame synchronizing signal of 16 bits following a preamble signal of 16 bits. Each of the remaining time slots has a predetermined bit length of 166 bits different from the bit length of the leading time slot. The last one $TS_n$ of the time slots is accompanied by guard bits (not shown) of 22 bits.

The frame synchronizing signal is produced by the central station 11 and delivered to the repeater stations 13 and to the substations 12. Consequently, the repeater stations 13 and the substations 12 are all operated in synchronism with the frame synchronizing signal.

Figure 3:
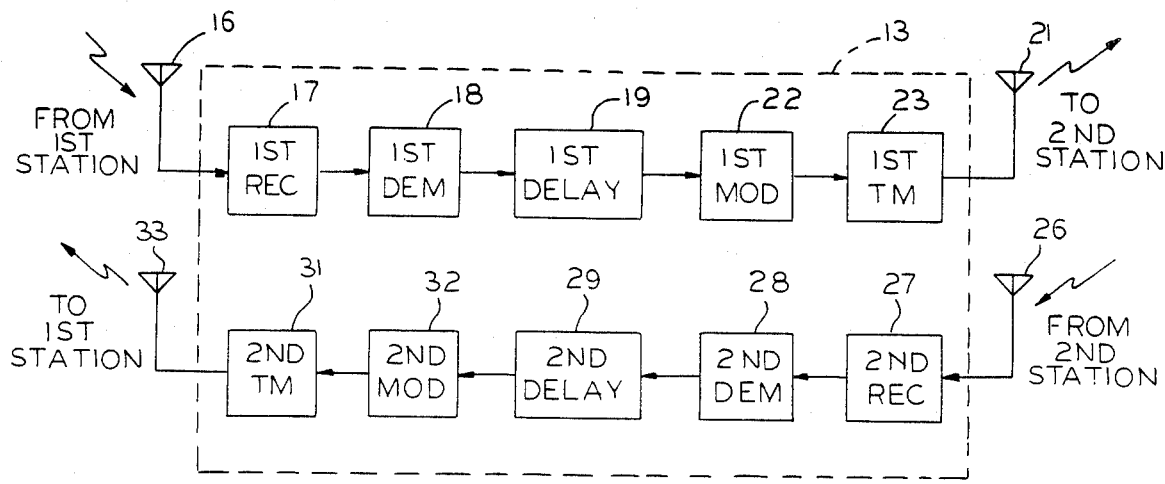
FIG. 3 shows a block diagram of a conventional repeater station for use in the radio relay system illustrated in FIG. 1.

Referring to FIG. 1 again and FIG. 3 afresh, a conventional repeater station indicated at 13 is used as each one of the repeater stations 13-1–13-q illustrated in FIG. 1 and is placed between an upward and a downward station which are situated upwards and downwards of the repeater station 13, respectively. The upward station may be either the central station 11 or another repeater station while the downward station, either a further repeater station or the substations 12. The upward and the downward stations will be called a first and a second station, respectively, hereinafter. For a better understanding of this invention, let the illustrated repeater station 13 be operated as the repeater station 13-1 illustrated in FIG. 1. In this event, the central station 11 acts as the first station while each of the substation 12-2 and the repeater stations 13-2 and 13-3, as the second station. The repeater station 13-1 may be referred to as a specific repeater station.

The specific repeater station 13-1 serves to repeat a first sequence of downward time slots from the first station to the second station as a second sequence of downward time slots. Each of the first and the second sequences is similar to that illustrated in FIG. 2. Therefore, the frame synchronizing signal is included in a particular or a control time slot $TS_0$ of each of the first and the second sequences. For convenience of description, the particular time slot $TS_0$ in each of the first and the second sequences may be called a particular downward time slot and is represented by $TS_{0d}$. More particularly, the signals are supplied from the first or upward station to a first reception antenna 16 as the first sequence of downward time slots and is sent through a first receiver 17 to a first demodulator 18 to be demodulated into a succession of first demodulated bit signals. The first demodulated signal is delayed a first predetermined delay time $t_f$ by a first delay circuit 19 and is sent from a first transmission antenna 21 to the second station as the second sequence of downward time slots after subjected to modulation and amplification by a first modulator 22 and a first transmitter 23, respectively. At this time, the signals are sent to the second station in synchronism with the frame synchronizing signal.

On the other hand, the specific repeater station 13-1 is operable to transmit a first succession of upward time slots to the first station in response to a second succession of upward time slots received from the second station. Each of the first and the second successions includes a particular or a control upward time slot $TS_{0u}$ corresponding to the particular downward time slot $TS_{0d}$, although somewhat different from each of the first and the second sequences of downward time slots. Anyway, each of the first and the second successions forms a frame having a frame length which is common to that illustrated with reference to FIG. 2.

More specifically, the signals are supplied from the second station to a second reception antenna 26 to be sent through a second receiver 27 to a second demodulator 28. As a result, the second demodulator 28 produces a succession of second demodulated bit signals. The second demodulated bit signals are delayed a second predetermined delay time $t_s$ by a second delay circuit 29 to be supplied to a second transmitter 31 through a second modulator 32 for carrying out modulation of the second demodulated bit signals. The second predetermined delay time $t_s$ may be equal to the first predetermined delay time $t_f$. An amplified and modulated signal is sent through a second transmission antenna 33 towards the first or central station in synchronism with the frame synchronizing signal.

In FIG. 2, it is to be noted that the specific repeater station 13-1 is supplied with the time division multiple signals through various kinds of transmission paths and that each time slot is assigned common to the respective substations 12. This means that each time slot received at the specific repeater station 13-1 is individually variable or fluctuated from one another in dependency on the transmission paths, as will be described in detail.

Figure 4:
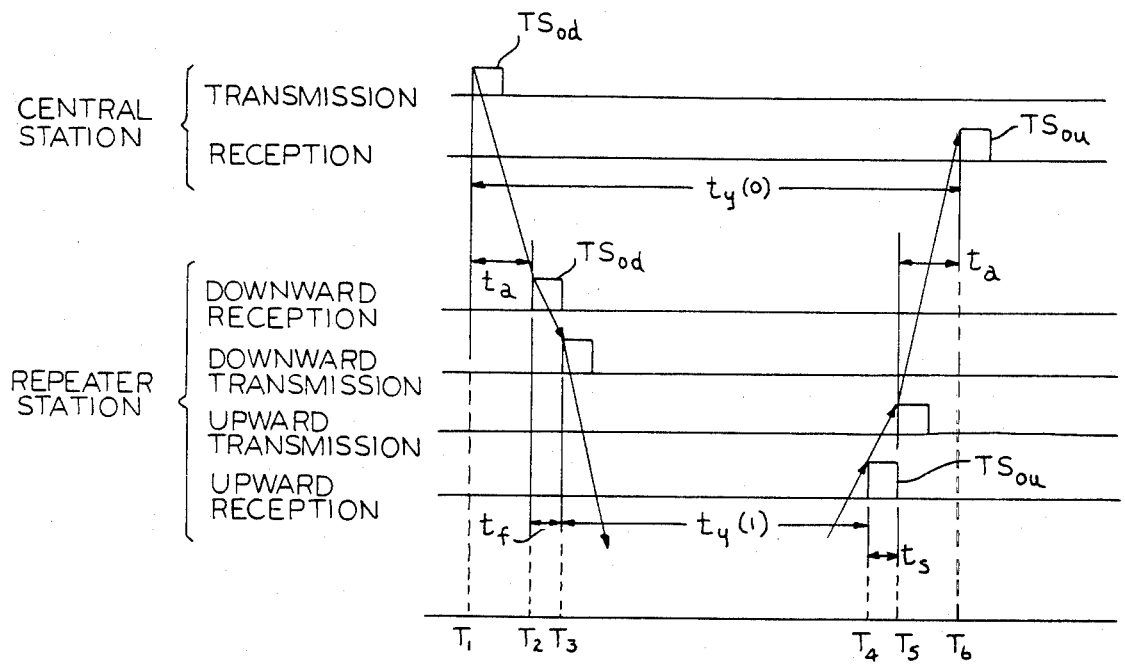
FIG. 4 shows a time chart for describing operation of the conventional repeater station illustrated in FIG. 3.

Referring to FIG. 4, discussion will be directed to each of the particular downward time slot $TS_{0d}$ and the particular upward time slot $TS_{0u}$ by way of example. The central station 11 transmits the particular downward time slot $TS_{0d}$ at a first time instant $T_1$ towards the specific repeater station 13-1. After a transmission delay time $t_a$ between the central and the specific repeater stations 11 and 13-1, the particular downward time slot $TS_{0d}$ is received at the repeater station 13-1 at a second time instant $T_2$ and delayed the first predetermined delay time $t_f$ by the first delay circuit 19 as described in conjunction with FIG. 3 to be sent to the second station at a third time instant $T_3$.

The particular downward time slot $TS_{0d}$ transmitted from the repeater station 13-1 is returned back to the specific repeater station 13-1 as the particular upward time slot $TS_{0u}$ at a fourth time instant $T_4$ after a time interval $t_y(1)$. The time interval $t_y(1)$ may be called a reception time interval at the specific repeater station 13-1. The particular upward time slot $TS_{0u}$ is delayed the second predetermined delay time $t_s$ by the second delay circuit 29 to be transmitted from the repeater station 13-1 to the central station 11 at a fifth time instant $T_5$. Thereafter, the particular upward time slot $TS_{0u}$ is received by the central station 11 at a sixth time instant $T_6$ after the transmission delay time $t_a$ between the repeater station 13-1 and the central station 11. Thus, the central station 11 receives the particular upward time slot $TS_{0u}$ after a time interval $t_y(0)$ at the sixth time instant $T_6$. The time interval $t_y(0)$ is defined between production of the particular downward time slot $TS_{0d}$ and reception of the particular upward time slot $TS_{0u}$ and may be named a reception time interval at the central station 11. As is apparent from FIG. 4, the reception time interval $t_y(0)$ is given by:

$$t_y(0) = 2t_a + t_f + t_y(1) + t_s. \tag{1}$$

However, it is practically difficult to precisely determine the reception time interval $t_y(0)$ because the transmission delay time $t_a$ is inevitably variable. In this connection, the reception time interval $t_y(0)$ may be called a theoretical or an ideal reception time interval.

Let a practical transmission delay time and a practical reception time interval be represented by $t_a'$ and $t_y'(0)$, respectively. Under the circumstances, the practical reception time interval $t_y'(0)$ is given by:

$$t_y'(0) = 2t_a' + t_f + t_y(1) + t_s. \quad (2)$$

From Equations (1) and (2), a difference, namely, a time deviation $\Delta t_y$ between the theoretical and the practical reception intervals is given by:

$$\Delta t_y = |t_y(0) - t_y'(0)|. \quad (3)$$

Equation (3) shows that the practical reception time interval $t_y'(0)$ is shifted from the theoretical reception time interval $t_y(0)$ by $\Delta t_y$.

As is the case with the reception time interval at the central station 11, the reception time interval $t_y(1)$ which may be theoretically determined at the specific repeater station 13-1 is different from a practical reception time interval $t_y'(1)$.

Like in Equation (3), a time deviation $\Delta t_y(1)$ between the theoretical and the practical reception time intervals $t_y(1)$ and $t_y'(1)$ is given by:

$$\Delta t_y(1) = |t_y(1) - t_y'(1)|. \quad (4)$$

Taking Equation (4) into consideration, that reception time interval at the central station 11 which is represented by $t_y''(0)$ is modified into:

$$t_y''(0) = t_y(0) + \Delta t_y(0) + \Delta t_y(1).$$

As a result, a time deviation $\Delta t$ from the theoretical reception time interval $t_y(0)$ is given by:

$$\Delta t = \Delta t_y(0) + \Delta t_y(1). \quad (5)$$

Likewise, when the particular upward time slot $TS_{0u}$ is supplied to the central station 11 through the repeater stations equal in number to m, a time deviation $\Delta t$ is represented by:

$$\Delta t = \sum_{q=0}^{m} \Delta t_y(q). \quad (6)$$

Equation (6) also holds with respect to the remaining downward and the remaining upward time slots except the particular downward and the particular upward time slots.

As readily understood from FIG. 1, each of the upward time slots reaches the central station 11 through various kinds of transmission paths and is, therefore, individually deviated from one another. In order to put the radio relay system into normal operation without a malfunction, the above-mentioned time deviation or variation should be reduced as little as possible.

Figure 5:
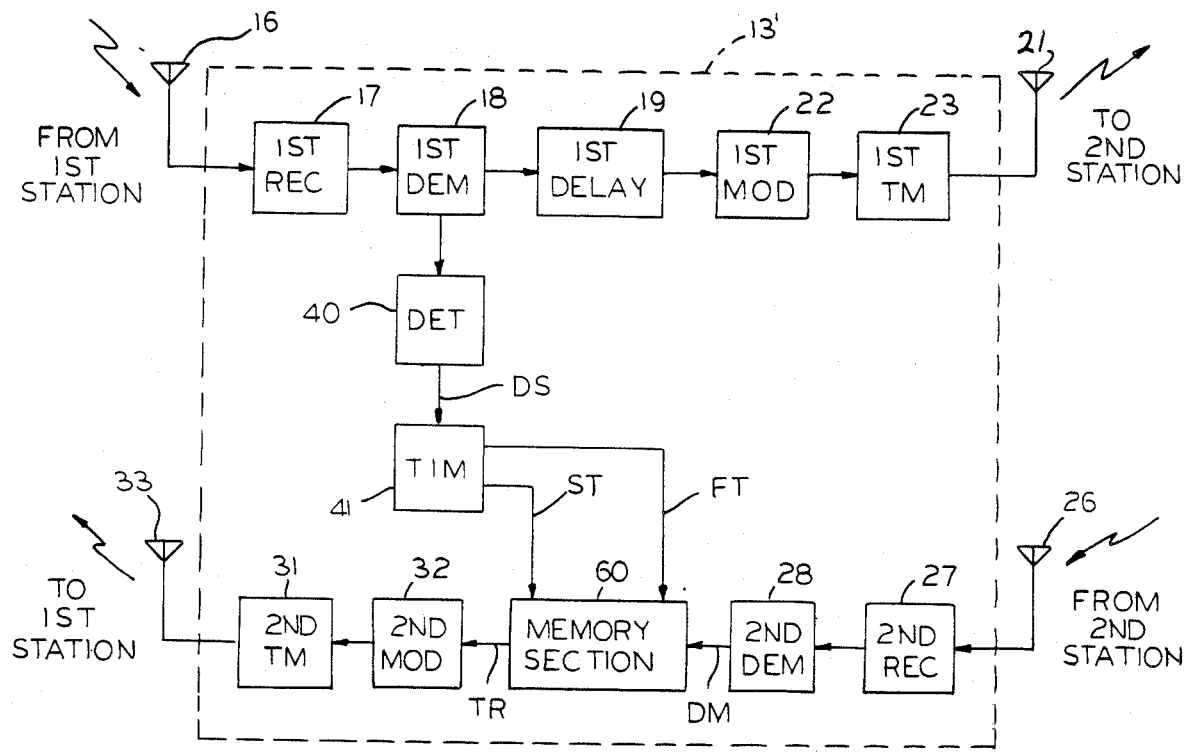
FIG. 5 shows a block diagram of a repeater station according to a preferred embodiment of this invention, which is for use in the radio relay system illustrated in FIG. 1.

Referring to FIG. 5, a repeater station 13' according to a preferred embodiment of this invention is assumed to be operated as the specific repeater station 13-1 illustrated in FIG. 1 and comprises similar parts designated by like reference numerals. The illustrated repeater station 13' further comprises a detector 40 supplied with the first demodulated bit signal succession from the first demodulator 18. The detector 40 detects the frame synchronizing signal included in the first sequence of downward time slots and produces a detection signal DS on detection of the frame synchronizing signal. Such a detector 40 may comprise a shift register for successively storing the time division multiple access signals, a reference circuit for storing a reference signal representative of the frame synchronizing signal, and a comparator for comparing the stored signals with the reference signal to produce the detection signal when the former coincides with the latter.

Figure 6:
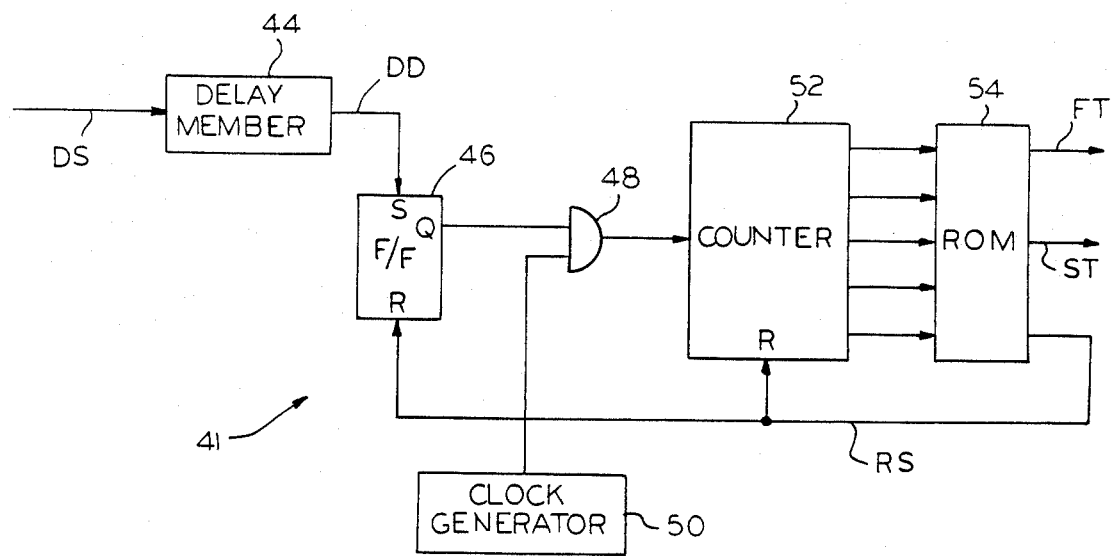
FIG. 6 shows a block diagram of a timing circuit for use in the repeater station illustrated in FIG. 5.

Referring to FIG. 6 anew and FIG. 5 again, the detection signal DS is supplied from the detector 40 to a timing circuit 41. The timing circuit 41 comprises a delay member 44 (FIG. 6) for delaying the detection signal DS a first predetermined duration. The first predetermined duration is predictively determined so that the upward particular time slot reaches the specific repeater station 13-1 after lapse of the first predetermined duration. More specifically, the first predetermined duration is decided in consideration of the first predetermined delay time $t_f$ in the first delay circuit 19 (FIG. 5) and the ideal reception time interval $t_y(1)$ at the specific repeater station 13-1. In the example being illustrated, the first predetermined duration is equal to that total length of the first predetermined delay time $t_f$ and the ideal reception time interval $t_y(1)$ from which a duration for the preamble signal of the downward particular time slot is subtracted.

Thus, the delay member 44 produces a delayed detection signal DD delayed the first predetermined duration relative to the detection signal.

Responsive to the delayed detection signal DD, a flip flop 46 is set to supply an enable signal of a logic "1" level to an AND gate 48. The enable signal lasts each time slot, as will become clear as the description proceeds. The AND gate 48 is given a sequence of clock pulses from a clock generator 50. The AND gate 48 therefore allows the clock pulses to pass therethrough during presence of the enable signal.

Supplied with the clock pulses through the AND gate 48, a counter 52 successively counts the clock pulses to produce a sequence of counts as a sequence of address signals, respectively.

The timing circuit 41 comprises a read-only memory 54 having a plurality of addresses equal in number to the number (2816) of bits included in each frame. First and second timing pulses FT and ST each of which takes a logic "1" level are memorized in each of the addresses. The read-only memory 54 produces the first timing pulses FT of which a leading one appears in response to the delayed detection signal DD. The leading timing pulse may be referred to as a first timing signal. Each of the second timing pulses ST is delayed the second predetermined delay time $t_s$ relative to each of the first timing pulses FT. Thus, each of the second timing pulses is produced when the second predetermined delay time $t_s$ lapses after production of each of the first timing pulses FT. For example, a leading one of the second timing pulses ST appears when the second predetermined delay time $t_s$ lapses after production of the first timing signal. The leading one of the second timing pulses ST is referred to as a second timing signal. The second predetermined delay time $t_s$ may be called a second predetermined duration.

In this structure, when a specific one of the addresses is accessed by one of the address signals, one of either the first or the second timing pulses FT or ST is read out of the specific address and lasts during the one address signal. Likewise, each timing pulse is successively read out of the read-only memory 54 by accessing each address by the address signals.

The second timing pulses ST may be produced by delaying the first timing pulses FT the second predetermined duration by the use of a delay element.

When the first timing pulses FT are all read out of the read-only memory 54 together with the second timing pulses ST, a reset signal RS is fed back to the flip flop 46 to reset the same.

Figure 7:
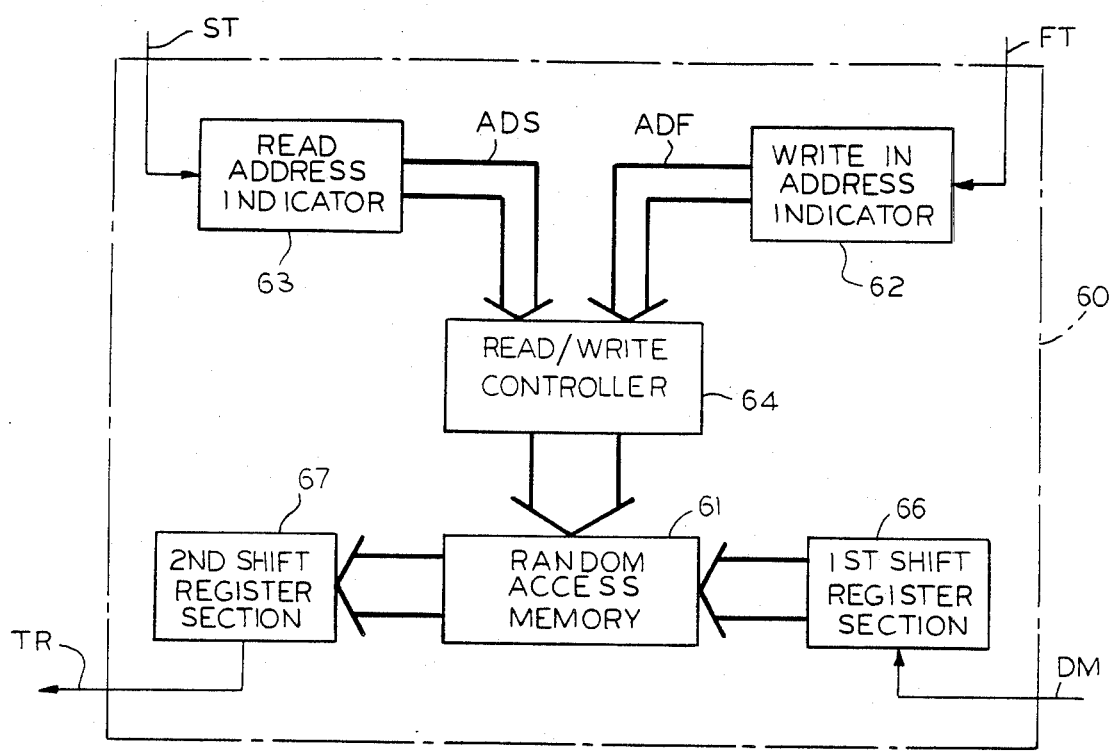
FIG. 7 shows a block diagram of a memory section for use in the repeater station illustrated in FIG. 5.

Referring to FIG. 7 afresh and FIG. 5 again, the first and the second timing pulses FT and ST are sent from the timing circuit 41 to a memory section 60 between the second demodulator 28 and the second modulator 32. The memory section 60 is supplied with the second demodulated bit signal succession designated by DM from the second demodulator 28 to produce a succession of memorized signals TR. More specifically, the memory section 60 comprises a random access memory 61 having a plurality of address blocks. Each address block has a plurality of addresses, each having a bit capacity of 8 bits and serves to memorize the signals included in each time slot. In this structure, each signal of the second demodulated bit signal is memorized in each address of 8 bits.

The memory section 60 comprises a write-in address indicator 62 responsive to each of the first timing pulses FP for producing a first address signal ADF and a read address indicator 63 responsive to each of the second timing pulses SP for producing a second address signal ADS. The first and the second address signals ADF and ADS are selectively supplied through a read/write controller 64 to the random access memory 61.

On the other hand, the second demodulated bit signal sequence DM is successively and serially stored in a first shift register section 66. The first shift register section 66 serves to convert the serial demodulated signal DM into a parallel bit signal of 8 bits. For this purpose, the first shift register section 66 comprises a shift register of 8 stages and a counter for producing an enable signal each time when the second demodulated bit signal DM is counted to 8. Simultaneously with the enable signal, the parallel bit signal is stored in an address specified by the first address signal ADF kept in the write-in address indicator 64. Similar operation is successively carried out with respect to each of the addresses specified by the first address signal ADF.

After production of the first address signal ADF, the second address signal ADS specifying the same address as the first address signal ADF is given to the random access memory 61 from the read address indicator 63. As a result, memorized demodulated signals are read out of the random access memory 61 in parallel to be stored in a second shift register 67. The second shift register 67 serves as a parallel-to-serial converter for converting each of the parallel demodulated bit signals to a serial bit signal. The serial bit signal is produced from the second shift register 67 as the memorized signal sequence TR. At any rate, the random access memory 61 memorizes the signals during the second predetermined duration $t_s$.

Turning back to FIG. 5, the memorized signal sequence TR is supplied through the second modulator 32 and the second transmitter 31 to the second transmission antenna 33 and is sent to the central station 11.

Figure 8:
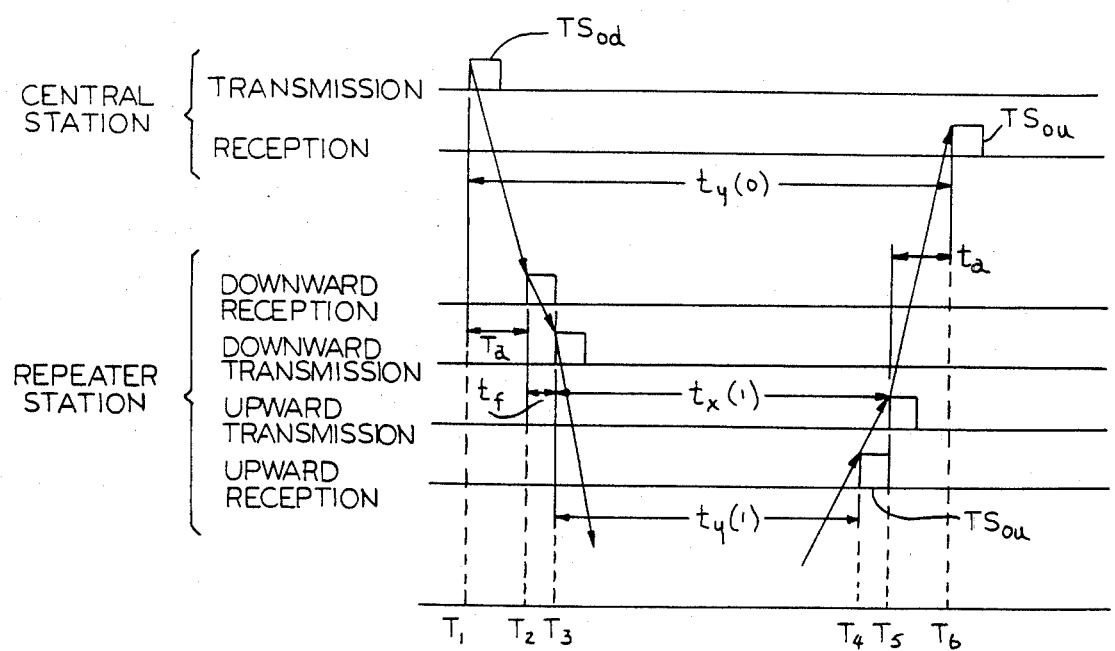
FIG. 8 shows a time chart for describing operation of the repeater station illustrated in FIG. 5.

Referring to FIG. 8, operation of the specific repeater station 13-1 will be described in conjunction with the central station 11 by way of example. When the particular downward time slot $TS_{0d}$ is produced at the first time instant $T_1$ as described in connection with FIG. 4, the time slot $TS_{0d}$ is received by the specific repeater station 13-1 at the second time instant $T_2$ after the transmission delay time $t_a$ and is transmitted towards the second station at the third time interval $T_3$ after the first predetermined delay time $t_f$ through the first delay circuit 19. After the particular downward time slot $TS_{0d}$ is sent from the specific repeater station 13-1 at the third time instant $T_3$, the specific repeater station 13-1 produces the leading one of the first pulses FP at the fourth time instant $T_4$ at which the particular upward time slot $TS_{0d}$ is to arrive at the specific repeater station 13-1. The fourth time instant $T_4$ appears after a reception time interval $t_7(1)$ equal to the predictive time interval. Thus, the predictive time interval is determined in consideration of the first predetermined delay time $t_f$ and the time interval $t_y(1)$.

The particular upward time slot $TS_{0u}$ is transmitted upwards from the specific repeater station 13-1 to the central station 11 at the fifth time instant $T_5$ which is determined by the leading one of the second timing pulses SP. The particular upward time slot $TS_{0u}$ reaches the central station 11 from the specific repeater station 13-1 at the sixth time instant $T_6$ after the transmission delay time $t_a$.

Herein, let a time interval $t_x(1)$ between the third time instant $T_3$ and the fifth time instant $T_5$ be equal to an ideal or a theoretical time interval which is invariable. It is assumed that the particular upward time slot $TS_{0u}$ is sent from the specific repeater station 13-1 to the central station 11 when the ideal time interval $t_x(1)$ lapses after transmission of the particular downward time slot $TS_{0d}$ from the specific repeater station 13-1 to the second station. Under these circumstances, the central station 11 can receive the particular upward time slot $TS_{0u}$ a reception time interval $t_y(0)$ after production of the particular downward time slot $TS_{0d}$. Such a reception time interval $t_y(0)$ at the central station 11 is given by:

$$t_y(0) = 2t_a + t_f + t_x(1). \tag{7}$$

It is assumed that the transmission delay time $t_a$ is varied into $t_a'$ and, as a result, the reception time interval is changed to $t_y'(0)$. At this time, Equation (7) is modified into:

$$t_y'(0) = 2t_a' + t_f + t_x(1). \tag{8}$$

From Equations (7) and (8), a time deviation $\Delta t_y(0)$ between $t_y(0)$ and $t_y'(0)$ is given by:

$$\Delta t_y(0) = |t_y(0) - t_y'(0)|. \tag{9}$$

When the reception time intervals at the specific repeater station 13-1 are theoretically and practically represented by $t_y(1)$ and $t_y'(1)$, respectively, a time deviation $\Delta t_y(1)$ between them is represented by:

$$\Delta t_y(1) = |t_y(1) - t_y'(1)|. \tag{10}$$

As is readily understood from Equation (8), the sixth time instant $T_6$ at which the particular upward time slot $TS_{0u}$ arrives at the central station 11 is irrespective of, namely, independent of the reception time interval $t_y(1)$ at the specific repeater station 13-1 because the ideal time interval $t_x(1)$ is invariable. Thus, the time interval $\Delta t_y(1)$ indicated by Equation (10) is variable only in dependency on the transmission delay time between the central station 11 and the specific repeater station 13-1. Similar relationships hold between each of the remaining repeater stations and a repeater station nearest to each remaining repeater station. In other words, each time deviation between one of the stations, such as the central station, the repeater stations, and another station downwardly nearest to the one station is dependent only on a transmission delay time therebetween. Such a transmission delay time is never added to the other transmission delay times between the remaining stations. Accordingly, the time deviation is never increased even when the particular upward time slot is received at the central station 11 through a lot of the repeater stations. In order to form the radio relay system, the first and the second predetermined durations should be varied in their lengths at each of the repeater stations.

Although the above-mentioned discussion has been directed to the particular downward and the particular upward time slots, this applies to the other time slots. With the repeater station, it is possible to protect each time slot from being individually varied from one another by the use of the memory section for memorizing the signals in each address block assigned to each time slot and for reading the memorized signals out of each address block. Anyway, the central station 11 can receive the signals without superposition of each time deviation occurring between two adjacent stations.

While this invention has thus far been described in conjunction with a preferred embodiment thereof, it will readily be possible for those skilled in the art to put this invention into practice in various other manners. For example, the substations may be either fixed or moved.

What is claimed is:

1. A repeater station for repeating a first sequence of downward time slots from a first station to a second station as a second sequence of downward time slots and for transmitting a first succession of upward time slots to said first station in response to a second succession of upward time slots received from said second station, a particular downward time slot in each of said first and said second sequences comprising a synchronizing signal, a particular upward time slot in each of said first and said second successions corresponding to said particular downward time slot, each of said downward and said upward time slots having a predetermined length except for said particular downward and upward time slots, said repeater station including detecting means for detecting the synchronizing signal included in said first sequence to produce a detection signal, wherein the improvement comprises:

timing signal producing means responsive to said detection signal for producing a first and a second timing signal when a first predetermined duration lapses after detection of the synchronizing signal included in said first sequence and when a second predetermined duration lapses after production of said first timing signal, respectively;

memory means coupled to said timing signal producing means and responsive to the first timing signal for memorizing information carried in the upward time slots of said second succession; and reading means responsive to said second timing signal for reading the upward time slot information memorized in said memory means to produce the upward time slots of said first succession.

2. A repeater station as claimed in claim 1, said first succession reaching said first station with a variable delay, wherein said first predetermined duration is such that the particular time slot of said succession reaches said repeater station after lapse of said first predetermined duration, said second predetermined duration being determined in consideration of said variable delay.

* * * * *